United States Patent
Johri et al.

(10) Patent No.: US 7,561,580 B1
(45) Date of Patent: Jul. 14, 2009

(54) PROVISIONING A MULTI-PROTOCOL LABEL SWITCHING INTERFACE BETWEEN NETWORKS

(75) Inventors: Pravin K. Johri, Aberdeen, NJ (US); Sanja Durinovic-Johri, Aberdeen, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 705 days.

(21) Appl. No.: 11/230,273

(22) Filed: Sep. 19, 2005

(51) Int. Cl.
  *H04L 12/28* (2006.01)
(52) U.S. Cl. .................................. 370/395.5; 370/409
(58) Field of Classification Search ........................ None
  See application file for complete search history.

(56) References Cited

U.S. PATENT DOCUMENTS

| | | | |
|---|---|---|---|
| 6,865,151 B1 | 3/2005 | Saunders | |
| 6,904,018 B2 | 6/2005 | Lee et al. | |
| 6,914,912 B1 | 7/2005 | Skalecki et al. | |
| 6,915,445 B2 | 7/2005 | Navar et al. | |
| 6,925,081 B2 | 8/2005 | Meda | |
| 6,947,428 B1 * | 9/2005 | Andersson et al. | 370/395.5 |
| 2005/0180335 A1 * | 8/2005 | Lee | 370/252 |
| 2005/0213513 A1 * | 9/2005 | Ngo et al. | 370/254 |

* cited by examiner

*Primary Examiner*—Hong Cho
*Assistant Examiner*—Anthony Sol

(57) ABSTRACT

A method and system for enabling packet based communications using MPLS protocol between routing devices located on different networks. A network management system is used to provide a conduit for MPLS protocol information to flow between a routing device on one network and a routing device on another network to set up packet based MPLS communications between the networks. The flow of MPLS protocol information through the network management system enables the assignment of MPLS labels to packet communication between the routing devices on different networks without the need for using a Control protocol. The network management system may include systems such as an operations support system and an element management system.

4 Claims, 2 Drawing Sheets

PROVISIONING A MULTI-PROTOCOL LABEL SWITCHING INTERFACE BETWEEN NETWORKS

BACKGROUND OF THE INVENTION

The present invention is directed to network communication systems. More specifically, the present invention is directed to a method and system for providing Multi-Protocol Label Switching (MPLS) communications interface or inter-networking point between networks.

In circuit-switched packet networks, such as Frame Relay (FR) and Asynchronous Transfer Mode (ATM), customers request a circuit from the network to carry customer data between two specified end points. A circuit can also be provisioned in an Internet Protocol (IP) network using what is referred to as circuit emulation. Thus, it is understood that packet data routed through a network using ATM, FR or IP technology is associated with a circuit defined by the path between two locations.

Typically, the data packets for a particular circuit may travel a path through a number of different routing devices, such as routers and switches, in a number of different networks to reach their destination. The communication between each routing device is performed over a communication path referred to as a link. When the link is between routing devices in the same network, the trend in present day packet networks is to migrate toward using MPLS protocol to transfer packets over the link. In using MPLS protocol, packet data is transmitted over the link encapsulated with an MPLS label (and sometimes even with a stack of multiple MPLS labels). The MPLS label acts as a data packet header and is used to associate the packet data with a particular circuit and thereby help the routing device properly forward the data packets through the network. As a result, the MPLS labels must be locally unique. That is, on each link, a unique MPLS label must be used to identify each circuit.

When a link is needed between routing devices located in different networks, the traditional way to connect the routing devices is to use a Time Division Multiplexing interface between them and assign circuits to specific time slots on this interface. For example, a circuit could be assigned to the $7^{th}$ DS1 time slot in a DS3 link used as the interface. The trend, however, in such inter-networking is also to migrate to packet interfaces using the MPLS protocol.

When two routing devices intend to exchange data packets with each other using MPLS, one of the routing devices is selected as the source routing device and the other as the destination routing device. The source device calculates a path to the destination device and then sets up the communication circuit, called a label Switched Path (LSP), along this path. This path may pass through other routing devices and is specified as a sequence of communication links. Typically, on each link in the path, the downstream routing device assigns an MPLS label to the circuit and transmits a message over the link back to the upstream routing device informing it of the selected MPLS label. The upstream routing device can then use the selected MPLS label to encapsulate the packet data for this circuit, and transmit the encapsulated data to the downstream routing device over the link. In many cases the circuits are bi-directional and both routing devices at the two ends of a link act as downstream devices, one in each direction. While the accepted convention is for the downstream device to assign the MPLS label, the procedure is identical if the upstream device assigns the MPLS label. A communications circuit could also span two (or more) networks and could be made up of several circuit segments, one on each network and another between every two networks. There could be source and destination routing devices assigned to each segment of the circuit.

Within a network, the links between the routing devices are established and the routing devices are set up to use a Control protocol (i.e. Routing and Signaling protocol) over these links to set up communications between each other. When the routing devices are located on different networks, however, this is not always the case. Many times, even though the routing devices on different networks are connected by a communications link or inter-networking point there is no available common Control protocol that devices on both networks use to communicate with each other. In some cases this may be due to the fact that the routing devices on different networks are made by different manufacturers. In other cases, this may be due to the different communication technologies, such as ATM and IP, being used by the routing devices on different networks. In any case, the problem is that since there is no available Control protocol the routing devices have no way to assign MPLS labels and communicate the assigned labels to each other.

BRIEF SUMMARY OF THE INVENTION

The present invention provides a system and method for enabling routing devices on different networks to transmit packet data to each other over a communication link using MPLS protocol, and without using a Control protocol. This is accomplished by using a Network Management System as a conduit for the transmission of multi-protocol switching information between the routing devices on the different networks. The multi-protocol switching information includes the identification of at least one MPLS label for each circuit for which packet data will be transmitted between the networks. Typically, for each circuit, the multi-protocol switching information will include two MPLS labels, one for each direction of communications in the circuit. The Network Management System enables routing devices on different networks to assign MPLS labels for each circuit that will utilize the different networks to route packets using MPLS protocol. As a result, the Network Management System enables the routing devices on different networks to establish packet communications using MPLS protocol without having to use a Control protocol.

In accordance with an embodiment of the invention, the Network Management System includes an Operations Support System that is operable to pass information to and from a source routing device on one network and a destination routing device on another network. The information may include messages such as: (1) an MPLS label request message sent from the Operations Support System to either the source routing device or the destination routing device; and (2) an MPLS label assignment message sent from the source routing device and/or the destination routing device to the Operations Support System, etc. The MPLS label assignment message includes an identification of an MPLS label to be used for encapsulating packet data transmitted between the source and destination routing devices.

In accordance with another embodiment of the invention, the Network Management System includes two Element Management Systems, wherein one Element Management System communicates directly with a source routing device on one network and the other Element Management System communicates directly with a destination routing device on another network. In such an embodiment, the Element Management Systems enable information to flow from the source routing device to the destination routing device. The information includes messages such as: (1) an MPLS label request message sent from one Element Management System to either the source or the destination routing device; and (2) an MPLS label assignment message sent from the source routing device and/or the destination routing device to the respective Element Management Systems, etc. The MPLS label assignment message includes an identification of an MPLS label to be used for a particular packet communication between the source and destination routing devices.

These and other advantages of the invention will be apparent to those of ordinary skill in the art by reference to the following detailed description and the accompanying drawings.

DETAILED DESCRIPTION

Figure 1:
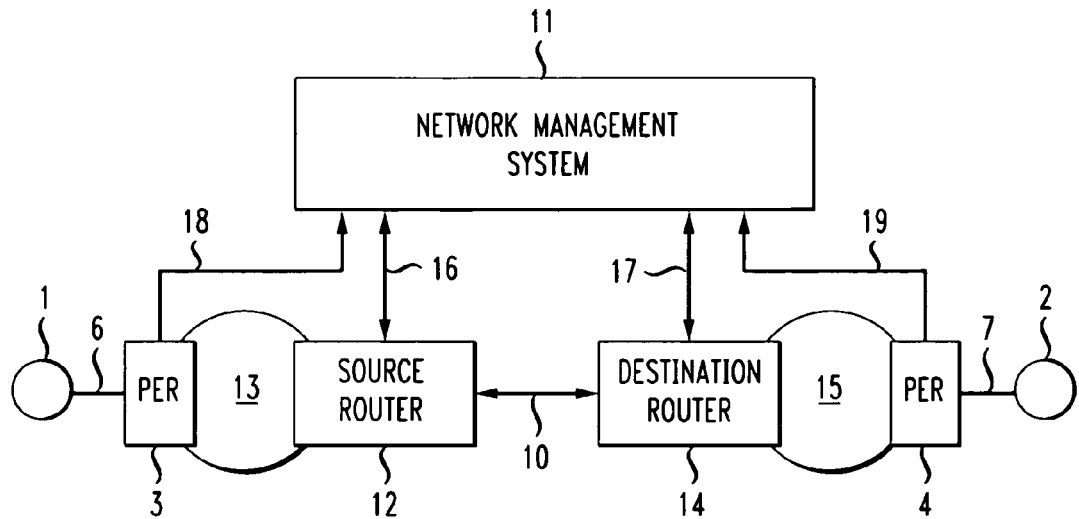
FIG. 1 illustrates an embodiment of an endpoint-to-endpoint communication system having a network-to-network interface using a network management system in accordance with the present invention.

FIG. 1 shows an embodiment of an endpoint-to-endpoint communication system 5 having a network-to-network interface 10 using a network management system 11 in accordance with the present invention. As shown, endpoint-to-endpoint communication system 5 has a source endpoint 1 connected to a Provider Edge Routing device (PER) 3 at the network provider's point of presence (POP) through access segment 6. PER 3 is connected to source router 12 located in network 13. Source router 12 is connected to destination router 14, located in network 15, through network-to-network interface 10. Destination router 14 is connected to PER 4 through network 15. PER 4 is connected to destination endpoint 2 through access segment 7. PER 3, source router 12, destination router 14 and PER 4 are all connected to network management system 11 through communication links 18, 16, 17 and 19, respectively.

When source endpoint 1 intends to communicate with destination endpoint 2, it requests network management system 11 to set up a connection between source endpoint 1 and destination endpoint 2. To do this, network management system 11 first determines the type of service required (e.g. Frame Relay, Asynchronous Transfer Mode, Internet Protocol, Private Line, etc.) and the service parameters (e.g. bandwidth), and then assigns a circuit ID to the connection. Based on the service requirements and the service parameters, network management system 11 then determines the different networks (e.g. networks 13 and 15 shown in FIG. 1) the connection needs to traverse between endpoints 1 and 2, as well as the interconnection points (e.g. network-to-network interface 10). The network management system then breaks the circuit into segments, (e.g. the segment between PER 3 and source router 12, and the segment between source router 12 and destination router 14) and provisions each segment. The assignment of source and destination labels to devices is by circuit segment. The circuit can be bi-directional, and the assignment of source and destination labels to devices can be switched in the reverse direction. The provisioning of the segments is essentially making sure that each segment allocates the required service for the circuit. All of this is well known in the art and need not be described in great detail herein.

The prior art, however, does not teach how network management system 11 would provision a segment for transmitting packet data between two different networks using MPLS protocol when there is no Control protocol available for setting up connections between the networks. This is due to the fact that the prior art systems provision inter-network segments using a Control protocol. It is through the Control protocol that the prior art systems are able to assign the MPLS labels required under MPLS protocol to encapsulate the circuits that utilize the inter-network connection. As is know in the art, an MPLS label identifies the particular circuit for which packet data is being transmitted across a link, and thereby helps destination routing device 14 determine how to further route the packet data it receives from routing device 12 to the destination endpoint 2. Thus, when there is no Control protocol available between the networks, the prior art systems have no way of setting up a link between the networks for transmitting packet data using MPLS protocol, and thus can not use the inter-network link to provide MPLS communications. The present invention solves this problem.

In accordance with the present invention, network management system 11 enables network-to-network interface 10 to be set up for MPLS packet communications without the need for using a Control protocol. Once network management system 11 identifies network-to-network interface 10 as a segment for the circuit between source endpoint 1 and destination endpoint 2, it sends destination router 14 a request to assign an MPLS label for the circuit ID assigned for communications from source endpoint 1 to destination endpoint 2. Destination endpoint 2 then selects an MPLS label and sends a message to network management system 11 including the MPLS label ID. Network management system 11 then sends a message including the selected MPLS label ID to source router 12. Once received, source routing device 12 can encapsulate the circuit with the MPLS label and begin transmitting packet data associated with the circuit to destination routing device 14. Then, in accordance with MPLS protocol, destination routing device 14 can forward the packets along the circuit path to destination endpoint 2.

As a result, network management system 11 essentially provides a conduit or communication path through which source routing device 12 and destination routing device 14 can communicate with each other to assign MPLS labels using MPLS protocol. Thus, when source routing device 12 and destination routing device 14 are not set up to use a Control protocol to communicate with each other, they may still be able to establish packet communications using MPLS protocol through network management system 11. Since most present-day networks already have access to and use network management systems for other purposes (e.g. provisioning, maintenance and billing), it would not be a costly proposition to utilize a network management system to enable routing devices on different networks to assign MPLS labels for packet communications between the networks.

Figure 2:
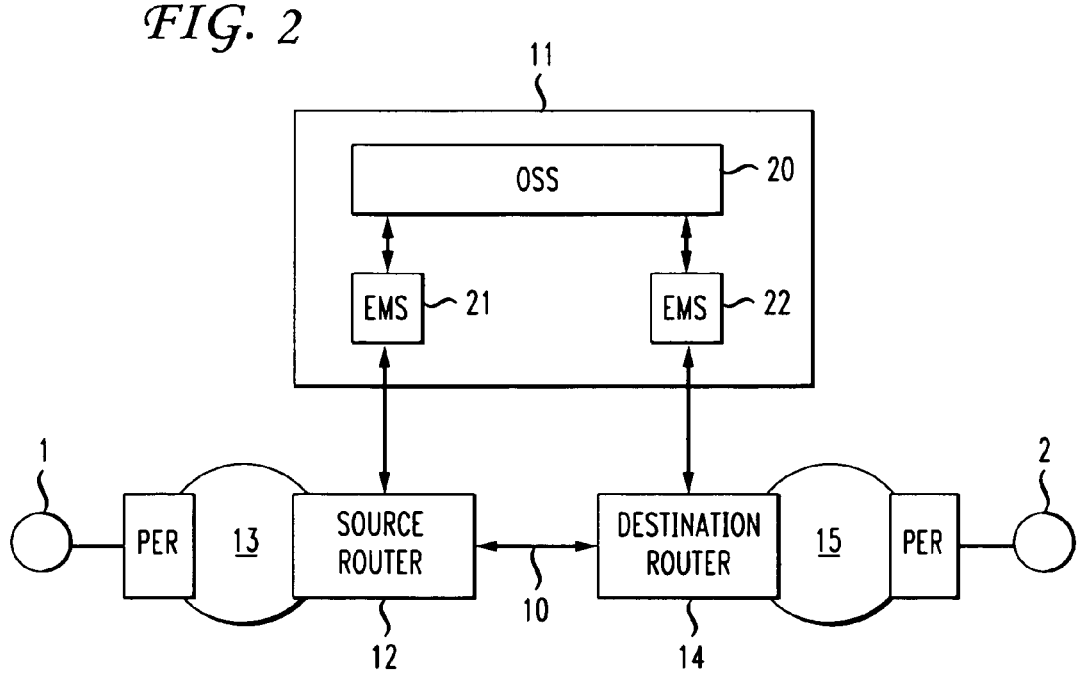
FIG. 2 shows an embodiment of the network management system shown in FIG. 1.

One embodiment of network management system 11 in accordance with the invention is shown in FIG. 2. As shown, network management system 11 is composed of operations support system (OSS) 20 coupled to an element management system (EMS) 21 and an element management system (EMS) 22. EMS 21 is connected to source routing device 12. EMS 22 is connected to destination routing device 14. OSS 20 and EMS 21 and 22 are well known devices in the art and thus the entire functionality of such devices need not be described in great detail herein. Instead, the added functionality of such devices in accordance with the present invention shall be described.

In provisioning a segment through network-to-network interface 10 for a circuit between source endpoint 1 and destination endpoint 2, OSS 20 is operable to request EMS 22 to get a unique MPLS label ID to be used for destination router 14 to receive packet data (associated with the circuit between source endpoint 1 and destination endpoint 2) from source router 12 over network-to-network interface 10. EMS 22 will then instruct destination router 14 to assign an MPLS label ID for the circuit and return the MPLS label ID to EMS 22. Once this is done, EMS 22 passes the MPLS label ID back to OSS 20 which, in turn, instructs EMS 21 to pass the MPLS label ID to source routing device 12 and to associate the MPLS label ID with the circuit. EMS 21 then instructs source routing device 12 to associate the MPLS label ID with the circuit. Once this is done, source routing device 12 can begin sending packet data encapsulated with the MPLS label ID in accordance with MPLS protocol.

It should be understood that network management system 11 is not limited to one way communications. That is, OSS 20 is also operable to request EMS 21 to get a unique MPLS label ID to be used for source router 12 to receive packet data (for the (possibly same, bi-directional) circuit set up for communications between destination endpoint 2 and source endpoint 1) from destination router 14 over network-to-network interface 10. EMS 21 will then instruct source router 12 to assign an MPLS label ID for the circuit and return the MPLS label ID to EMS 21. Once this is done, EMS 21 passes the MPLS label ID back to OSS 20 which, in turn, instructs EMS 22 to pass the MPLS label ID to destination routing device 14 and to associate the MPLS label ID with the circuit. EMS 22 then instructs destination routing device 14 to associate the MPLS label ID with the circuit. Once this is done, destination routing device 14 can begin sending packet data encapsulated with the MPLS label ID in accordance with MPLS protocol network.

To accomplish the above MPLS label ID assignment through network management system 11, there are several new messages types used. For an MPLS label request message from OSS 20 to EMS 21 and EMS 22 requesting assignment of an MPLS label to be used to receive data across network-to-network interface 10 and for a specified circuit ID, the MPLS label request message contains the circuit ID, one or more circuit parameters such as bandwidth, the interface point 10 and the request for the MPLS label. Similarly, for the MPLS label request message from EMS 21 and EMS 22 to source router 12 and destination router 14, respectively, requesting the assignment of the MPLS label ID, to associate it with a circuit ID, and to return the label ID, the request message contains the circuit ID, one or more circuit parameters such as bandwidth, the interface point 10, and the request for the MPLS label.

For an MPLS label assignment message from source routing device 12 or destination routing device 14 returning the assigned label ID to EMS 21 and EMS 22, respectively, the MPLS label assignment message contains the circuit ID and the MPLS label ID. Similarly, the assignment message from EMS 21 and EMS 22 to OSS 20 contains the same information as the assignment message from source routing device 12 and destination routing device 14.

For an MPLS label assignment message from OSS 20 to EMS 21 and EMS 22, as the case may be, instructing which MPLS label ID should be used for sending packet data across network-to-network interface 10 for a given circuit, the assignment message contains the circuit ID, one or more circuit parameters, the interface point, and the MPLS label ID to be used. Similarly, for MPLS label assignment messages from EMS 21 and EMS 22 to source routing device 12 and destination routing device 14, as the case may be, the messages contains the circuit ID, one or more circuit parameters, the interface point, and the MPLS label to be used.

It should be understood that the messages described above are only illustrative of one set of messages that can be used to enable source routing device 12 and destination routing device 14 to assign MPLS labels through the use of network management system 11. Any type of message having any desired format or content can be used to accomplish the assignment of the MPLS label IDs in accordance with the present invention.

It should also be understood that network management system 11 shown in FIG. 2 need not include both EMS 21 and EMS 22. In an alternative embodiment, network management system 11 may be composed of OSS 20 and any number of element management systems. For example, network management system 11 may be composed of only OSS 20 and no element management systems. In such an embodiment, OSS 20, source routing device 12, and destination routing device 14 may be operable to send information including the MPLS label request messages and MPLS label assignment messages, described above, directly to each other.

It should also be understood that network management system 11 shown in FIG. 2 need not include OSS 20. In an alternative embodiment, network management system 11 may be composed of EMS 21 and EMS 22 wherein EMS 21 and 22 are connected to each other. In such an embodiment, some of the MPLS label assignment messages can be exchanged directly between EMS 21 and EMS 22, and not forwarded via the OSS 20. EMS 21 and EMS 22 can send MPLS label request messages and receive MPLS assignment messages to and from source routing device 12 and destination routing device 14, respectively. Any MPLS label assignment message received from source routing device 12 by EMS 21 can be forwarded to EMS 22 through the direct link between them. Similarly, any MPLS label assignment message received from destination routing device 14 by EMS 22 can be forwarded to EMS 21 through the link. EMS 21 and 22 can then forward the respective MPLS label assignment message to source routing device 12 and destination routing device 14, as the case may be.

Figure 3:
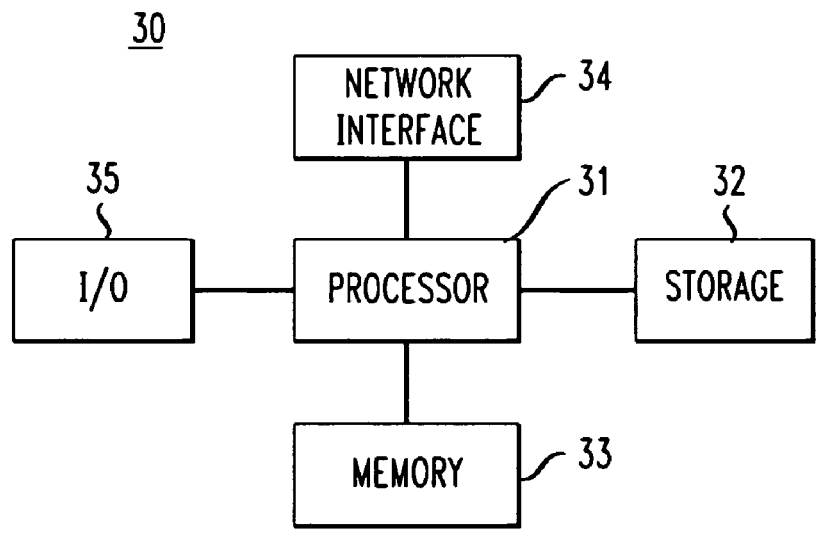
FIG. 3 shows a high level block diagram of a computer used to perform functions of the network management system.

It should be understood that source router 12, destination router 14, OSS 20, EMS 21 and EMS 22 may be implemented by computers executing program code to perform the above described functions. Such computers executing program code are well known in the art, and may be implemented, for example, using well known computer processors, memory units, storage devices, computer software, and other components. A high level block diagram of such a computer 300 is shown in FIG. 3. As shown, computer 30 contains a processor 31 which controls the overall operation of computer 30 by executing computer program instruction which define the application or functions to be performed. The computer program instructions may be stored in a storage device 32 (e.g. a magnetic disk) and loaded into memory 33 when execution of the computer program instructions is desired. Thus, the above described functions for OSS 20, EMS 21, EMS 22, source routing device 12 and destination routing device 14 will be defined by computer program instructions stored in memory 33 and/or storage device 32 and the function will be controlled by processor 31 executing the computer program instructions. Computer 30 also includes one or more network interfaces 34 for communicating with other devices via a network. Computer 30 also includes input/output 35 which represents devices (e.g., display, keyboard, mouse, speakers, buttons, etc.) that allow for user interaction with computer 30. One skilled in the art will recognize that an implementation of an actual computer will contain other components as well, and that FIG. 3 is a high level representation of some of the components of such a computer for illustrative purposes.

Figure 4:
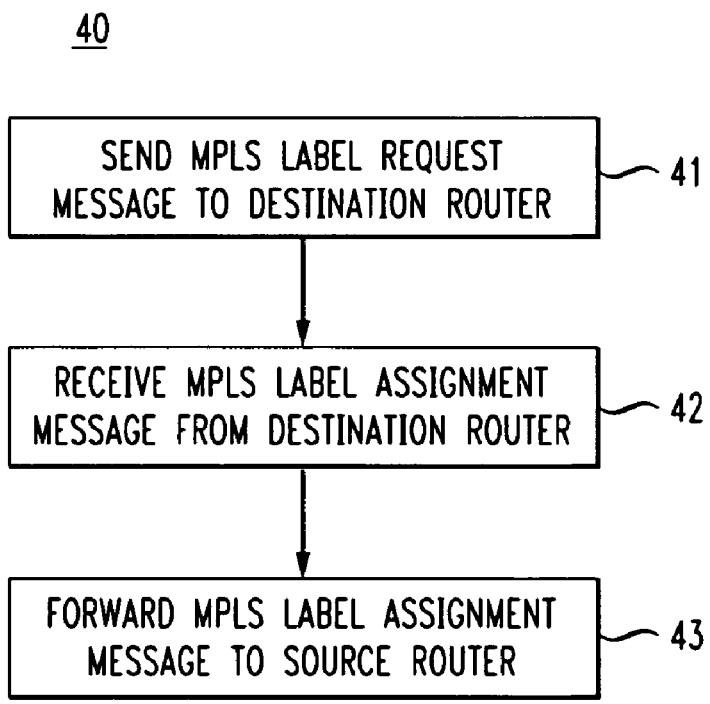
FIG. 4 illustrates a method for establishing a packet communications interface using MPLS protocol in accordance with the present invention.

FIG. 4 illustrates a method 40 performed by a network management system for establishing a network-to-network packet interface using MPLS protocol in accordance with the present invention. As shown, in step 41 a network management system is used to send an MPLS label request message to a destination routing device located on a destination network. The MPLS label request message is a request for the destination routing device to assign an MPLS label to be associated with a circuit that will use the network-to-network interface as a segment in a path set up for communicating data packets between two endpoints. The network management system may use an operations support system, an element management system, or a combination thereof to send the MPLS label request message to the destination routing device.

In step 42, the network management system receives an MPLS label assignment message from the destination routing device. The MPLS label assignment message will include an identification of a MPLS label selected by the destination routing device for receiving packet data associated with the circuit over the network-to-network interface. In step 43, the network management system forwards the MPLS label assignment message to the source routing device. The source routing device can then use the MPLS label to encapsulate the packet data and associate the packet data with the circuit. Once this is done, the source routing device can transmit the encapsulated data over a network-to-network interface using MPLS protocol.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for establishing a packet communications interface using MPLS protocol between a source routing device on one network and a destination routing device on another network, the method comprising the steps of:
   using an operations support system as a conduit for Multi-Protocol Label Switching Information to flow between the source and destination routing devices wherein the using step comprises the steps of:
   sending an MPLS label request message from the operations support system to the destination routing device;
   receiving an MPLS label assignment message from the destination routing device; and
   forwarding said MPLS label assignment message to the source routing device.

2. A method for establishing a packet communications interface using MPLS protocol between a source routing device on one network and a destination routing device on another network, the method comprising the steps of:
   using a source element management system and a destination element management system as a conduit for Multi-Protocol Label Switching Information to flow between the source and destination routing devices wherein the using step comprises the steps of:
   sending an MPLS label request message from the destination element management system to the destination routing device;
   receiving an MPLS label assignment message from the destination routing device; and
   forwarding the MPLS label assignment message from the destination element management system to the source routing device through the source element management system.

3. A network management system comprising:
   an operations support system for enabling the flow of Multi-Protocol Label Switching Information between a source routing device on one network and a destination routing device on another network, wherein the Multi-Protocol Label Switching Information comprises an MPLS label request message and an MPLS label assignment message;
   wherein said MPLS label request message comprises a request for an assignment of an MPLS label for a particular circuit, and wherein said MPLS label assignment message includes an identification of MPLS label associated with said particular circuit;
   wherein said operations support system is operable to send an MPLS label request message to the destination routing device, receive an MPLS label assignment message from the destination routing device, and forward the MPLS label assignment message to the source routing device.

4. A network management system comprising:
   a source element management system and a destination element management system for enabling the flow of Multi-Protocol Label Switching Information between a source routing device on one network and a destination routing device on another network; wherein said destination element management system is operable to send an MPLS label request message to the destination routing device, receive an MPLS label assignment message from the destination routing device, and forward the MPLS label assignment message to the source routing device through the source element management system.

* * * * *